United States Patent
Echigo et al.

(10) Patent No.: US 7,109,289 B2
(45) Date of Patent: Sep. 19, 2006

(54) MODIFIED POLYOXYALKYLENE POLYAMINE

(75) Inventors: Masatoshi Echigo, Kanagawa (JP); Hisayuki Kuwahara, Kanagawa (JP); Takeshi Koyama, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/767,170

(22) Filed: Jan. 30, 2004

(65) Prior Publication Data

US 2004/0210011 A1 Oct. 21, 2004

(30) Foreign Application Priority Data

Jan. 31, 2003 (JP) ............................. 2003-024250

(51) Int. Cl.
*C08G 73/02* (2006.01)

(52) U.S. Cl. ..................... 528/392; 525/540; 528/422

(58) Field of Classification Search ................ 528/392, 528/422; 525/540
See application file for complete search history.

(56) References Cited

U.S. PATENT DOCUMENTS

| 4,034,040 A | 7/1977 | Cronin et al. |
| 4,886,842 A | 12/1989 | Drain et al. |
| 6,562,934 B1 * | 5/2003 | Yonehama et al. ......... 528/122 |
| 2002/0055605 A1 | 5/2002 | Yonehama et al. |

FOREIGN PATENT DOCUMENTS

| EP | 0 046 088 | 2/1982 |
| EP | 0 435 497 | 7/1991 |
| EP | 0 499 206 | 8/1992 |
| WO | 98/03614 | 1/1998 |

\* cited by examiner

*Primary Examiner*—Ana Woodward
(74) *Attorney, Agent, or Firm*—Wenderoth, Lind & Ponack, L.L.P.

(57) ABSTRACT

A modified polyoxyalkylene polyamine obtained by addition reaction of a polyoxyalkylene polyamine and an alkenyl group-containing compound has a low viscosity and it provides, when used as a curing agent for epoxy resin, an epoxy resin composition which can provide an epoxy resin cured product having excellent chemical resistance.

16 Claims, No Drawings

MODIFIED POLYOXYALKYLENE POLYAMINE

BACKGROUND OF THE INVENTION

1) Field of the Invention

The present invention relates to a modified polyoxyalkylene polyamine, a curing agent for epoxy resin comprising said modified polyoxyalkylene polyamine, an epoxy resin composition comprising said curing agent for epoxy resin, and an epoxy resin cured product obtainable by curing said epoxy resin composition.

The modified polyoxyalkylene polyamine is applicable to a curing agent for epoxy resin and a raw material thereof to be utilized in an extremely wide field including application to a coating material, a material for electricity and electronics, a civil engineering and construction material, an adhesive, and a composite material, and is applicable to a chain extender and a raw material thereof of a polyurethane resin.

Furthermore, it can be utilized widely in various field such as a paper reinforcing agent, chemicals for rubber, boiler compounds, a slag inhibitor, a surfactant, an emulsifier, a dye, a pigment, a dyeing assistant, an oil solution for fiber, cosmetics, a crease-proofing agent, a chelating agent, an ore floatation agent, a detergent, a thixotropic agent, a pH adjuster, a pesticide, a herbicide, a stabilizer for agricultural chemicals, feed additives, catalysts, a polymerization accelerator, a polymerization inhibitor, a stabilizer, an ion-exchange resin, a gas absorbent, an antioxidant, a corrosion inhibitor, an antirust, a sterilizer, an antibacterial agent, an antifreeze liquid, a lubrication oil, a lubricant, an intermediate of pharmaceuticals, polyamide, a solvent and photographic chemicals.

2) Related Art

It has widely been known that various chain aliphatic polyamines are used as a curing agent for epoxy resin and a raw material thereof or a chain extender for polyurethane resin and a raw material thereof. Representative examples of these chain aliphatic polyamines include polyethylene polyamines such as diethylenetriamine and triethylenetetramine, each of which has been widely used.

However, these polyethylene polyamines generally have high vapor pressure and strong skin irritativeness. Moreover, an epoxy resin cured product using a curing agent for epoxy resin comprising these polyethylene polyamines as a raw material is inferior in chemical resistance.

Therefore, as a curing agent for epoxy resin, these polyethylene polyamines are scarcely used as it is recently. In most cases, they are used after various modifications of amino groups they have, depending on the intended purpose such as the improvement in safety and hygiene, in workability and in chemical resistance.

Representative methods for a modification of polyethylene polyamines include 1) a modification by Mannich reaction with a phenol compound and an aldehyde compound, 2) a modification by reaction with an epoxy compound, 3) a modification by reaction with a compound having a carboxyl group, 4) a modification by Michael reaction with an acryl compound and 5) combinations of any of 1) to 4).

In general, a molar number of modification of polyethylene polyamine is selected from the range wherein the obtainable modified polyethylene polyamine has at least one active hydrogen atom derived from the amino groups in the polyethylene polyamine before modification.

When the molar number of modification is relatively low, the obtainable modified polyethylene polyamine has a low viscosity. However, the amount of unreacted polyethylene polyamine becomes large, which causes such defects that the obtainable modified polyethylene polyamine may have high toxicity and its skin irritativeness may remain. In addition, a curing agent for epoxy resin using such modified polyethylene polyamine may be inferior in chemical resistance of a cured product.

On the other hand, when the molar number of modification is relatively high, the content of unreacted polyethylene polyamine in the obtainable modified polyethylene polyamine is small. However, the viscosity of the modified polyethylene polyamine becomes high, which brings about the requirement of lowering the viscosity by adding solvents or diluents in order to improve workability.

It is desired not to use solvents in light of environmental problems and it is necessary to limit the amount of diluents added in order to avoid the deterioration of the chemical resistance of a cured product.

Consequently, polyoxyalkylene polyamine has been developed as an alternative to polyethylene polyamine. Since polyoxyalkylene polyamine has relatively low vapor pressure and week skin irritativeness compared to polyethylene polyamine, the purpose such as improving in safety and hygiene and in workability has been accomplished.

However, a curing agent for epoxy resin using polyoxyalkylene polyamine as a raw material is not satisfactory in chemical resistance of a cured product. Therefore, polyoxyalkylene polyamine should also be modified in its amino groups in order to achieve the purpose such as the improvement of chemical resistance.

Representative methods for modification of polyoxyalkylene polyamine include the same methods as the above-mentioned modification methods of polyethylene polyamine.

In general, the molar number of modification of polyoxyalkylene polyamine can be selected from the range wherein the obtainable modified polyoxyalkylene polyamine has at least one active hydrogen atom derived from the amino groups in the polyoxyalkylene polyamine before modification.

When the molar number of modification is relatively low, the obtainable modified polyoxyalkylene polyamine has a low viscosity. However, the amount of unreacted polyoxyalkylene polyamine becomes large, which causes such defects that a curing agent for epoxy resin using the obtainable modified polyoxyalkylene polyamine as a raw material may be inferior in chemical resistance of a cured product.

On the other hand, when the molar number of modification is relatively high, the content of unreacted polyoxyalkylene polyamine in the obtainable modified polyoxyalkylene polyamine is small. However, the viscosity of the modified polyoxyalkylene polyamine becomes high, which brings about the requirement of lowering the viscosity by adding solvents or diluents in order to improve workability.

It is desired not to use solvents in light of environmental problems and it is necessary to limit the amount of diluents added in order to avoid the deterioration of the chemical resistance of a cured product.

SUMMARY OF THE INVENTION

An object of the present invention is to provide a modified polyoxyalkylene polyamine having a low viscosity which can provide, when used as a curing agent for epoxy resin, an epoxy resin cured product with excellent chemical resistance.

As a result of extensive studies, the inventors have found that a particular modified polyoxyalkylene polyamine has a low viscosity and a curing agent for epoxy resin comprising said modified polyoxyalkylene polyamine provides an epoxy resin cured product having excellent chemical resistance, and have accomplished the present invention.

That is, the present invention provides a modified polyoxyalkylene polyamine described in the following 1) to 5), a curing agent for epoxy resin described in 6), an epoxy resin composition described in 7), and an epoxy resin cured product described in 8).

1) A modified polyoxyalkylene polyamine obtainable by addition reaction of a polyoxyalkylene polyamine and an alkenyl group-containing compound.
2) The modified polyoxyalkylene polyamine according to 1), wherein said polyoxyalkylene polyamine has a weight average molecular weight of not more than 1000.
3) The modified polyoxyalkylene polyamine according to 1) or 2), wherein a carbon number of said alkenyl group-containing compound is 2 to 16.
4) The modified polyoxyalkylene polyamine according to 3), wherein said alkenyl group-containing compound is styrene.
5) The modified polyoxyalkylene polyamine according to 1) to 4), wherein a molar number of modification of said polyoxyalkylene polyamine by said alkenyl group-containing compound satisfies the following mathematical formula (1).

$$\frac{1}{10}A \leq X \leq A \quad (1)$$

wherein "A" represents a number of active hydrogen atoms in said polyoxyalkylene polyamine and "X" represents a molar number of modification.

6) A curing agent for epoxy resin comprising the modified polyoxyalkylene polyamine according to 1) to 5).
7) An epoxy resin composition comprising an epoxy resin and the curing agent for epoxy resin according to 6).
8) An epoxy resin cured product obtainable by curing the epoxy resin composition according to 7).

DETAILED DESCRIPTION OF THE INVENTION

The polyoxyalkylene polyamine to be used in the present invention should not particularly be limited as long as it has at least two amino groups which are reactive to epoxy resin. However, since the polyoxyalkylene polyamine having a molecular weight of more than 1000 is a liquid of relatively high viscosity or a partly or entirely solid substance, it is preferable that the polyoxyalkylene polyamine to be used in the present invention has a weight average molecular weight of not more than 1000, more preferably, not more than 800.

Examples of the polyoxyalkylene polyamine to be used in the present invention include polyoxyalkylenediamine such as polyoxyethylenediamine, polyoxypropylenediamine, polyoxytetramethylenediamine, and poly(oxyethylene-oxypropylene)diamine, and polyoxyalkylenetriamine such as polyoxyethylenetriamine and polyoxypropylenetriamine.

These may be used independently, or two or more of them may be used at a time by mixing each other. Further, other amine-type curing agents for epoxy resin may be mixed together with them as long as the properties of cured products are not deteriorated.

The alkenyl group-containing compound to be used in the present invention is a compound having at least one alkenyl group, namely an unsaturated hydrocarbon compound.

Examples of the alkenyl group-containing compounds to be used include any kinds of unsaturated hydrocarbon compounds, among which a hydrocarbon compound having a carbon number of 2 to 16 is preferable.

More specifically, the alkenyl group-containing compound to be used can be selected from the group consisting of a chain unsaturated hydrocarbon compound, an alicyclic unsaturated hydrocarbon compound and an aromatic unsaturated hydrocarbon compound having a carbon number of 2 to 16, preferably 2 to 10.

Examples of the chain unsaturated hydrocarbon compound to be used in the present invention include an alkenyl compound and an alkadienyl compound such as ethylene, propylene, butene, butadiene, pentene, hexene, heptene, octene, nonene, decene, isobutylene, 2-pentene, 3-methyl-1-butene, 2-methyl-2-butene and 2,3-dimethyl-2-butene. Examples of an alicyclic unsaturated hydrocarbon compound include a cycloalkenyl compound such as cyclohexene and a cycloalkadienyl compound such as cyclohexadiene. Examples of an aromatic unsaturated hydrocarbon compound include styrene and divinylbenzene. Among these unsaturated hydrocarbon compounds, styrene is particularly preferable.

The modified polyoxyalkylene polyamine of the present invention is obtainable by modification, i.e. addition reaction of the above-mentioned polyoxyalkylene polyamine and the above-mentioned alkenyl group-containing compound.

The product of addition reaction is used as a curing agent for epoxy resin as it is in the condition of the mixture of addition product of the polyoxyalkylene polyamine and the alkenyl group-containing compound, and unreacted polyoxyalkylene polyamine.

A molar number of modification of the polyoxyalkylene polyamine by the alkenyl group-containing compound is not necessarily limited as long as gelation is avoided. However, when the molar number of modification is too small, the amount of unreacted polyoxyalkylene polyamine becomes large and the feature of modification by the alkenyl group-containing compound does not appear clearly. When the molar number of modification is too large, the number of active hydrogen atoms in amino groups becomes too small. Therefore, it is preferable that the relation between the molar number of modification by the alkenyl group-containing compound and the number of active hydrogen atoms derived from amino groups of a polyoxyalkylene polyamine before modification satisfies the following mathematical formula (1). The term "a molar number of modification" here means a molar number of alkenyl group-containing compounds reacting with one mole of polyoxyalkylene polyamine.

$$\frac{1}{10}A \leq X \leq A \quad (1)$$

wherein "A" represents a number of active hydrogen atoms in a polyoxyalkylene polyamine before modification and "X" represents a molar number of modification.

It is particularly preferable that the molar number of modification by an alkenyl group-containing compound is selected within the range wherein the relation with a number of active hydrogen atoms derived from amino groups in a polyoxyalkylene polyamine before modification satisfies the following mathematical formula (2).

$$\frac{1}{8}A \leq X \leq \frac{2}{3}A \qquad (2)$$

wherein "A" represents a number of active hydrogen atoms in a polyoxyalkylene polyamine before modification and "X" represents a molar number of modification.

Preferable catalysts to be used in the process of synthesizing the modified polyoxyalkylene polyamine of the present invention include any substances exhibiting strong basicity. Examples of such catalysts include alkaline metal, alkaline metal amide and alkylated alkaline metal. Among them, alkaline metal amide represented by the general formula MNRR' wherein M is an alkaline metal, N is nitrogen and R and R' are, each independently, hydrogen or an alkyl group, is preferable and lithium amide ($LiNH_2$) is more preferable.

Though the amount used of the catalyst depends on conditions such as species of raw materials, a reaction proportion and a reaction temperature, it is preferably 0.05 to 5% by weight and more preferably 0.1 to 3% by weight based upon the total weight of the raw materials used.

The reaction temperature at the time of synthesizing the modified polyoxyalkylene polyamine of the present invention is usually 50 to 150° C. and preferably around 100° C. When the reaction temperature is too low, the addition reaction rate of the polyoxyalkylene polyamine and the alkenyl group-containing compound may become too slow. When the reaction temperature is too high, a polymer of alkenyl group-containing compounds may be produced as a by-product.

After the completion of the reaction, the reaction liquid thus obtained comprises at least one kind of modified polyoxyalkylene polyamines which are addition products of a polyoxyalkylene polyamine and an alkenyl group-containing compound and catalyst such as an alkaline metal amide.

The catalyst can be removed from the reaction product by filtration. When an alkaline metal amide is used as the catalyst, filtration can be easily carried out after changing the alkaline metal amide to a readily removable salt thereof by adding acids such as hydrochloric acid, hydrogen chloride gas and acetic acid, alcohols such as methanol and ethanol or water. For example, when water is added, an alkaline metal amide is changed to a hydroxide thereof which is easy to filtrate.

The viscosity of the modified polyoxyalkylene polyamine of the present invention is preferably 10 to 1000 mPa·s/23° C. When the viscosity is higher than 1000 mPa·s, its workability as a curing agent for epoxy resin may be deteriorated.

A curing agent for epoxy resin of the present invention is comprising the above-mentioned modified polyoxyalkylene polyamine of the present invention. The curing agent may be used independently or as a mixture with other polyamine-type curing agents for epoxy resin.

In the case of using as a mixture with other curing agents, the mixing ratio of the modified polyoxyalkylene polyamine is preferably 20% by weight or more, more preferably 30% by weight or more based upon the total weight of the curing agent for epoxy resin. When the mixing ratio of the modified polyoxyalkylene polyamine is less than 20% by weight, it may cause the impairment of the characteristic of the modified polyoxyalkylene polyamine of the present invention.

The epoxy resin composition of the present invention is comprising epoxy resin and the above-mentioned curing agent for epoxy resin of the present invention.

Examples of epoxy resin used for an epoxy resin composition of the present invention include any epoxy resins having glycidyl groups which can react to form cross-linking bond with active hydrogen atoms derived from amino groups of the modified polyoxyalkylene polyamine contained in the curing agent for epoxy resin of the present invention, and any compounds can be selected from the group consisting of saturated or unsaturated aliphatic compounds, alicyclic compounds, aromatic compounds and heterocyclic compounds.

More specifically, examples of the epoxy resins include at least one selected from the group consisting of epoxy resin having a glycidyl ether segment derived from bisphenol A, epoxy resin having a glycidyl ether segment derived from bisphenol F, epoxy resin having a glycidyl amine segment derived from metaxylylenediamine, epoxy resin having a glycidyl amine segment derived from 1,3-bis(aminomethyl) cyclohexane, epoxy resin having a glycidyl amine segment derived from diaminodiphenylmethane, epoxy resin having a glycidyl amine segment derived from p-aminophenol, epoxy resin having a glycidyl ether segment derived from phenol novolak, and epoxy resin having a glycidyl ether segment derived from resorcinol.

Among them, epoxy resin having a glycidyl ether segment derived from bisphenol A and epoxy resin having a glycidyl ether segment derived from bisphenol F are particularly preferable.

The content of the curing agent for epoxy resin of the present invention in an epoxy resin composition is preferably the amount wherein the ratio of the total mole number of active hydrogen atoms of the curing agent for epoxy resin of the present invention based upon the total mole number of epoxy groups of epoxy resin (=the total mole number of active hydrogen atoms (mol)/the total mole number of epoxy groups (mol))is 0.7 to 1.0. (The total mole number of active hydrogen atoms of the curing agent=the amount of curing agent (g)/active hydrogen equivalent weight(g/mol), and the total mole number of epoxy groups of the epoxy resin=the amount of epoxy resin (g)/epoxy equivalent weight(g/mol).)

When the ratio of the total mole number of active hydrogen atoms is less than 0.7, the degree of cross-linkage of a cured product is insufficient. Meanwhile, when the ratio of the total mole number of active hydrogen atoms is more than 1.0, the amount of hydrophilic amino groups becomes excessive, which causes the deterioration of water resistance.

Further, other components for modification such as a filler and a plasticizer, components for adjusting fluidity such as a diluent and a thixotropic agent, and other ingredients such as a pigment, a leveling agent, and a tackifier may be added to the epoxy resin composition of the present invention depending on the intended use.

The epoxy resin composition of the present invention can be cured by well known methods to obtain an epoxy resin cured product. The curing condition is not limited and it can be selected appropriately depending on the intended use.

PREFERRED EMBODIMENT OF THE INVENTION

The present invention will be described in more detail below, referring to Examples which are not intended to limit the scope of the present invention.

Evaluation of the chemical resistance of an epoxy resin cured coating film was carried out by the following methods;

An epoxy resin composition was coated on a steel plate with thickness of 200 μm under the conditions of 23° C. and 50% RH. The coated steel plates were cured for 7 days and then they were dipped in each chemicals, i.e. sodium hydroxide with the concentration of 10%, water, methanol and ethanol, for 7 days under the condition of 23° C. Change of the appearance of the coating films were observed visually to evaluate chemical resistance.

The result of the evaluation was shown based on the following 4 stages of criteria;
◎; Excellent, ○; good Δ; fair X; poor

EXAMPLE 1

460.0 g (2.0 mol) of polyoxypropylenediamine, manufactured by Huntsman Corporation, brand name; "JEFFAMINE D-230" (Molecular Weight; 230), having an active hydrogen equivalent weight of 60 and 21.3 g (0.93 mol) of lithium amide, a reagent manufactured by Merck Ltd., were charged to a 2 L (liter) flask equipped with an agitator, a thermometer, a nitrogen gas inlet, a dropping funnel and a condenser. Then, its interior temperature was raised to 100° C. in a nitrogen gas stream with stirring. Keeping the temperature at 100° C., 208.4 g (2.0 mol) of styrene, a special grade reagent, manufactured by Wako Pure Chemical Industries, Ltd., in Japan was added thereto dropwise over 4 hours. After the completion of dropwise addition, its interior temperature was maintained to 100° C. for 4 hours.

Then, after the reaction liquid was cooled to the room temperature, 167.7 g (9.3 mol) of water as the amount of 10 times equal mol to the charged lithium amide was added thereto and stirred. After separating precipitates in the liquid in flask by filtration, remained water was removed by vacuum distillation, whereby 635.0 g of Modified polyoxypropylenediamine A was obtained as a reaction product. The molar number of modification of the Modified polyoxypropylenediamine A was 1.0 mole. The viscosity thereof was 30 mPa·s/25° C. and the active hydrogen equivalent weight was 111.

An epoxy resin composition was prepared by mixing bisphenol A type liquid epoxy resin with an epoxy equivalent weight of 190 g/eq, manufactured by Japan Epoxy Resins Co., Ltd., brand name; Epicoat 828, and the above Modified polyoxypropylenediamine A as a curing agent for epoxy resin at a ratio shown in Table 1.

The epoxy resin composition thus obtained was cured under the conditions of 23° C. and 50% RH to prepare an epoxy resin cured coating film, and the property of the coating film was evaluated. The evaluation result was shown in Table 1.

EXAMPLE 2

Except for charging 296.0 g (2.0 mol) of polyoxyethylenediamine, manufactured by Huntsman Corporation, brand name; "JEFFAMINE EDR-148" (Molecular Weight; 148), having an active hydrogen equivalent weight of 36 and 1.5 g (0.065 mol) of lithium amide to the flask, the addition reaction was carried out in the same manner as Example 1.

Then, after the reaction liquid was cooled to the room temperature, 11.7 g (0.65 mol) of water as the amount of 10 times equal mol to the charged lithium amide was added thereto and stirred. After separating precipitates in the liquid in flask by filtration, remained water was removed by vacuum distillation, whereby 478.8 g of Modified polyoxyethylenediamine B was obtained as a reaction product. The molar number of modification of the Modified polyoxyethylenediamine B was 1.0 mole. The viscosity thereof was 30 mPa·s/25° C. and the active hydrogen equivalent weight was 84.

An epoxy resin composition was prepared in the same manner as Example 1 by mixing bisphenol A type liquid epoxy resin and the above Modified polyoxyethylenediamine B as a curing agent for epoxy resin at a ratio shown in Table 1.

The epoxy resin composition thus obtained was cured under the conditions of 23° C. and 50% RH to prepare an epoxy resin cured coating film, and the property of the coating film was evaluated. The evaluation result was shown in Table 1.

EXAMPLE 3

806.0 g (2.0 mol) of polyoxypropylenetriamine, manufactured by Huntsman Corporation, brand name; "JEFFAMINE T-403" (Molecular Weight; 403), having an active hydrogen equivalent weight of 81 and 35.0 g (1.5 mol) of lithium amide were charged to a similar flask as one used in Example 1. Then, its interior temperature was raised to 100° C. in a nitrogen gas stream with stirring. Keeping the temperature at 100° C., 312.6 g (3.0 mol) of styrene was added thereto dropwise over 6 hours. After the completion of dropwise addition, its interior temperature was maintained to 100° C. for 4 hours.

Then, after the reaction liquid was cooled to the room temperature, 270.0 g (15.0 mol) of water as the amount of 10 times equal mol to the charged lithium amide was added thereto and stirred. After separating precipitates in the liquid in flask by filtration, remained water was removed by vacuum distillation, whereby 1051.5 g of Modified polyoxypropylenetriamine C was obtained as a reaction product. The molar number of modification of the Modified polyoxypropylenetriamine C was 1.5 mole. The viscosity thereof was 580 mPa·s/25° C. and the active hydrogen equivalent weight was 124.

An epoxy resin composition was prepared in the same manner as Example 1 by mixing bisphenol A type liquid epoxy resin and the above Modified polyoxypropylenetriamine C as a curing agent for epoxy resin at a ratio shown in Table 1.

The epoxy resin composition thus obtained was cured under the conditions of 23° C. and 50% RH to prepare an epoxy resin cured coating film, and the property of the coating film was evaluated. The evaluation result was shown in Table 1.

Comparative Example 1

In the Comparative Example 1, an epoxy adduct modification was carried out as a modification without using alkenyl group-containing compounds.

460.0 g (2.0 mol) of polyoxypropylenediamine having an active hydrogen equivalent weight of 60, brand name; "JEFFAMINE D-230" (Molecular Weight; 230), was charged to a similar flask as one used in Example 1.

Then, its interior temperature was raised to 80° C. in a nitrogen gas stream with stirring. Keeping the temperature at 80° C., 260.0 g (2.0 mol) of butyl glycidyl ether with an epoxy equivalent weight of 130 g/eq, manufactured by NOF Corporation, brand name; NISSAN EPIOL B (hereinafter, "BGE"), was added thereto dropwise over 2 hours. After the completion of dropwise addition, its interior temperature was raised to 100° C. and the reaction was carried out for 2 hours, whereby 720.0 g of BGE addition product of polyoxypropylenediamine was obtained.

The viscosity of the BGE addition product of polyoxypropylenediamine thus obtained was 1500 mPa·s/25° C. and the active hydrogen equivalent weight was 120 (the number of active hydrogen atoms was 3).

Using the BGE addition product of polyoxypropylenediamine thus obtained as a curing agent for epoxy resin, an epoxy resin composition was prepared in the same manner as Example 1 by mixing with bisphenol A type liquid epoxy resin at a ratio shown in Table 2.

The epoxy resin composition thus obtained was cured in the same manner as Example 1 to prepare an epoxy resin cured coating film, and the property of the coating film was evaluated. The evaluation result was shown in Table 2.

Comparative Example 2

In the Comparative Example 2, an epoxy adduct modification was carried out as a modification without using alkenyl group-containing compounds.

296.0 g (2.0 mol) of polyoxyethylenediamine having an active hydrogen equivalent weight of 36, brand name; "JEFFAMINE EDR-148" (Molecular Weight; 148), was charged to a similar flask as one used in Example 1.

Then, its interior temperature was raised to 80° C. in a nitrogen gas stream with stirring. Keeping the temperature at 80° C., 260.0 g (2.0 mol) of BGE was added thereto dropwise over 2 hours. After the completion of dropwise addition, its interior temperature was raised to 100° C. and the reaction was carried out for 2 hours, whereby 556.0 g of BGE addition product of polyoxyethylenediamine was obtained.

The viscosity of the BGE addition product of polyoxyethylenediamine thus obtained was 1600 mPa·s/25° C. and the active hydrogen equivalent weight was 93 (the number of active hydrogen atoms was 3).

Using the BGE addition product of polyoxyethylenediamine thus obtained as a curing agent for epoxy resin, an epoxy resin composition was prepared in the same manner as Example 1 by mixing with bisphenol A type liquid epoxy resin at a ratio shown in Table 2.

The epoxy resin composition thus obtained was cured in the same manner as Example 1 to prepare an epoxy resin cured coating film, and the property of the coating film was evaluated. The evaluation result was shown in Table 2.

Comparative Example 3

In the Comparative Example 1, an epoxy adduct modification was carried out as the modification without using alkenyl group-containing compounds.

806.0 g (2.0 mol) of polyoxypropylenetriamine having an active hydrogen equivalent weight of 81, brand name; "JEFFAMINE T-403" (Molecular Weight; 403), was charged to a similar flask as one used in Example 1.

Then, its interior temperature was raised to 80° C. in a nitrogen gas stream with stirring. Keeping the temperature at 80° C., 390.0 g (3.0 mol) of BGE was added thereto dropwise over 3 hours. After the completion of dropwise addition, its interior temperature was raised to 100° C. and the reaction was carried out for 2 hours, whereby 1196.0 g of BGE addition product of polyoxypropylenetriamine was obtained.

The viscosity of the BGE addition product of polyoxypropylenetriamine thus obtained was 2500 mPa·s/25° C. and the active hydrogen equivalent weight was 133 (the number of active hydrogen atoms was 4.5).

Using the BGE addition product of polyoxypropylenetriamine thus obtained as a curing agent for epoxy resin, an epoxy resin composition was prepared in the same manner as Example 1 by mixing with bisphenol A type liquid epoxy resin at a ratio shown in Table 2.

The epoxy resin composition thus obtained was cured in the same manner as Example 1 to prepare an epoxy resin cured coating film, and the property of the coating film was evaluated. The evaluation result was shown in Table 2.

Comparative Example 4

Using the polyoxypropylenediamine having an active hydrogen equivalent weight of 60 as a curing agent for epoxy resin, an epoxy resin composition was prepared in the same manner as Example 1 by mixing with bisphenol A type liquid epoxy resin at a ratio shown in Table 2.

The epoxy resin composition thus obtained was cured under the conditions of 23° C. and 50% RH to prepare an epoxy resin cured coating film, and the property of the coating film was evaluated. The evaluation result was shown in Table 2.

Comparative Example 5

Using the polyoxyethylenediamine having an active hydrogen equivalent weight of 36 as a curing agent for epoxy resin, an epoxy resin composition was prepared in the same manner as Example 1 by mixing with bisphenol A type liquid epoxy resin at a ratio shown in Table 2.

The epoxy resin composition thus obtained was cured under the conditions of 23° C. and 50% RH to prepare an epoxy resin cured coating film, and the property of the coating film was evaluated. The evaluation result was shown in Table 2.

Comparative Example 6

Using the polyoxypropylenetriamine having an active hydrogen equivalent weight of 81 as a curing agent for epoxy resin, an epoxy resin composition was prepared in the same manner as Example 1 by mixing with bisphenol A type liquid epoxy resin at a ratio shown in Table 2.

The epoxy resin composition thus obtained was cured under the conditions of 23° C. and 50% RH to prepare an epoxy resin cured coating film, and the property of the coating film was evaluated. The evaluation result was shown in Table 2.

TABLE 1

|  | Example 1 | Example 2 | Example 3 |
|---|---|---|---|
| Epoxy resin composition (g) | | | |
| Epicoat 828 | 100 | 100 | 100 |
| Modified Polyoxyproylenediamine A | 60 | | |
| Modified Polyoxyethylenediamine B | | 45 | |
| Modified Polyoxypropylenetriamine C | | | 67 |

TABLE 1-continued

|  | Example 1 | Example 2 | Example 3 |
|---|---|---|---|
| Property of a cured coating film Chemical resistance | | | |
| 10% Sodium hydroxide | ◉ | ◉ | ◉ |
| Water | ◉ | ◉ | ◉ |
| Methanol | ◉ | ◉ | ◉ |
| Ethanol | ◉ | ◉ | ◉ |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Epoxy resin composition (g) | | | | | | |
| Epicoat 828 | 100 | 100 | 100 | 100 | 100 | 100 |
| BGE addition product of polyoxypropylenediamine | 65 | | | | | |
| BGE addition product of polyoxyethylenediamine | | 50 | | | | |
| BGE addition product of polyoxypropylenetriamine | | | 72 | | | |
| Polyoxypropylenediamine | | | | 32 | | |
| Polyoxyethylenediamine | | | | | 19 | |
| Polyoxypropylenetriamine | | | | | | 44 |
| Property of a cured coating film Chemical resistance | | | | | | |
| 10% Sodium hydroxide | ○ | ○ | ○ | Δ | Δ | Δ |
| Water | ○ | Δ | ○ | Δ | X | ○ |
| Methanol | ○ | ○ | ○ | X | X | X |
| Ethanol | ○ | ○ | ○ | X | X | X |

As clear from the above Examples, a modified polyoxyalkylene polyamine of the present invention has a low viscosity, and the epoxy resin composition using a curing agent for epoxy resin comprising the above modified polyoxyalkylene polyamine provides an epoxy resin cured product having excellent chemical resistance.

What is claimed is:

1. A modified polyoxyalkylene polyamine obtained by addition reaction of a polyamine consisting essentially of polyoxyalkylene polyamine and an unsaturated hydrocarbon compound.

2. The modified polyoxyalkylene polyamine according to claim 1, wherein said polyoxyalkylene polyamine has a weight average molecular weight of not more than 1000.

3. The modified polyoxyalkylene polyamine according to claim 2, wherein the carbon number of said unsaturated hydrocarbon compound is 2 to 16.

4. The modified polyoxyalkylene polyamine according to claim 3, wherein said unsaturated hydrocarbon compound is styrene.

5. The modified polyoxyalkylene polyamine according to claim 4, wherein the molar number of modification of said polyoxyalkylene polyamine by said unsaturated hydrocarbon compound satisfies the following mathematical formula (1).

$$\frac{1}{10}A \leq X \leq A \tag{1}$$

wherein "A" represents a number of active hydrogen atoms in said polyoxyalkylene polyamine and "X" represents the molar number of modification.

6. A curing agent for epoxy resin comprising the modified polyoxyalkylene polyamine according to claim 4.

7. The modified polyoxyalkylene polyamine according to claim 2, wherein the molar number of modification of said polyoxyalkylene polyamine by said unsaturated hydrocarbon compound satisfies the following mathematical formula (1).

$$\frac{1}{10}A \leq X \leq A \tag{1}$$

wherein "A" represents a number of active hydrogen atoms in said polyoxyalkylene polyamine and "X" represents the molar number of modification.

8. A curing agent for epoxy resin comprising the modified polyoxyalkylene polyamine according to claim 2.

9. The modified polyoxyalkylene polyamine according to claim 1, wherein the carbon number of said unsaturated hydrocarbon compound is 2 to 16.

10. The modified polyoxyalkylene polyamine according to claim 9, wherein said unsaturated hydrocarbon compound is styrene.

11. The modified polyoxyalkylene polyamine according to claim 10, wherein the molar number of modification of said polyoxyalkylene polyamine by said unsaturated hydrocarbon compound satisfies the following mathematical formula (1).

$$\frac{1}{10}A \leq X \leq A \tag{1}$$

wherein "A" represents a number of active hydrogen atoms in said polyoxyalkylene polyamine and "X" represents the molar number of modification.

12. A curing agent for epoxy resin comprising the modified polyoxyalkylene polyamine according to claim 10.

13. The modified polyoxyalkylene polyamine according to claim 9, wherein the molar number of modification of said polyoxyalkylene polyamine by said unsaturated hydrocarbon compound satisfies the following mathematical formula (1).

$$\frac{1}{10} A \leqq X \leqq A \qquad (1)$$

wherein "A" represents a number of active hydrogen atoms in said polyoxyalkylene polyamine and "X" represents the molar number of modification.

14. A curing agent for epoxy resin comprising the modified polyoxyalkylene polyamine according to claim 9.

15. The modified polyoxyalkylene polyamine according to claim 1, wherein the molar number of modification of said polyoxyalkylene polyamine by said unsaturated hydrocarbon compound satisfies the following mathematical formula (1).

$$\frac{1}{10} A \leqq X \leqq A \qquad (1)$$

wherein "A" represents the number of active hydrogen atoms in said polyoxyalkylene polyamine and "X" represents the molar number of modification.

16. A curing agent for epoxy resin comprising the modified polyoxyalkylene polyamine according to claim 1.

* * * * *